United States Patent
Agarwal et al.

(10) Patent No.: US 8,467,204 B2
(45) Date of Patent: Jun. 18, 2013

(54) HIGH VOLTAGE POWER SUPPLY

(75) Inventors: Pankaj Agarwal, Suwon-si (KR);
Kang-hyun Yi, Yesan-gun (KR);
Sung-jin Choi, Suwon-si (KR);
Joon-hyun Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 225 days.

(21) Appl. No.: 12/951,632

(22) Filed: Nov. 22, 2010

(65) Prior Publication Data
US 2011/0242853 A1    Oct. 6, 2011

(30) Foreign Application Priority Data
Mar. 31, 2010   (KR) .................................. 2010-28900

(51) Int. Cl.
*H02M 3/335* (2006.01)
*H02M 3/315* (2006.01)

(52) U.S. Cl.
USPC .............. 363/25; 363/21.02; 363/24; 363/26; 363/59; 363/60

(58) Field of Classification Search
USPC .......................... 363/21.02, 24, 25, 26, 59, 60
See application file for complete search history.

(56) References Cited

U.S. PATENT DOCUMENTS

| | | | | |
|---|---|---|---|---|
| 4,380,044 A | * | 4/1983 | Parr | 363/21.17 |
| 4,716,512 A | * | 12/1987 | Takamura et al. | 363/61 |
| 4,789,997 A | * | 12/1988 | Madsen et al. | 378/109 |
| 4,855,891 A | | 8/1989 | Paul | |
| 4,893,227 A | * | 1/1990 | Gallios et al. | 363/26 |
| 5,053,727 A | * | 10/1991 | Jann et al. | 331/62 |
| 7,903,432 B2 | * | 3/2011 | Luo et al. | 363/13 |
| 7,944,719 B2 | * | 5/2011 | Luerkens | 363/61 |
| 8,274,805 B2 | * | 9/2012 | Kim et al. | 363/59 |
| 2009/0251120 A1 | * | 10/2009 | Kim et al. | 323/288 |
| 2010/0135052 A1 | * | 6/2010 | Luerkens | 363/61 |
| 2010/0226155 A1 | * | 9/2010 | Hanington | 363/125 |
| 2010/0226156 A1 | * | 9/2010 | Hanington | 363/126 |

FOREIGN PATENT DOCUMENTS

EP   0 429 315 A2   5/1991
EP   0 991 174 A2   4/2000

OTHER PUBLICATIONS

Communication dated Jun. 6, 2012 issued by the European Patent Office in counterpart European Application No. 11160089.6.

* cited by examiner

Primary Examiner — Bao Q Vu
(74) Attorney, Agent, or Firm — Sughrue Mion, PLLC

(57) ABSTRACT

A high voltage power supply is provided. The high voltage power supply includes an inverter which converts a DC voltage input to the high voltage power supply into a first AC voltage, a transformer including an input winding unit and a plurality of output winding units, wherein the input winding unit receives the first AC voltage from the inverter and the plurality of output winding units generates and outputs a second AC voltage, and a voltage multiplier unit which boosts the second AC voltage output by the transformer and outputs a boosted voltage, and the voltage multiplier unit includes a plurality of voltage multipliers which are connected to each other in series and the plurality of voltage multipliers may be connected to the plurality of output winding units respectively.

20 Claims, 7 Drawing Sheets

HIGH VOLTAGE POWER SUPPLY

CROSS-REFERENCE TO RELATED APPLICATION

This application claims priority from Korean Patent Application No. 2010-28900, filed in the Korean Intellectual Property Office on Mar. 31, 2010, the disclosure of which is incorporated herein by reference.

BACKGROUND

1. Field

Aspects of the exemplary embodiments relate a high voltage power supply, and more particularly, to a high voltage power supply that boosts an output voltage using a voltage multiplier.

2. Description of the Related Art

A high voltage power supply is an apparatus which boosts an input voltage to generate a high output voltage and is used in various devices such as a television, an image forming apparatus, and a plasma generator.

The high voltage power supply may boost the output voltage by adjusting the turn ratio of a transformer or using a controller that controls output voltage. However, there is a limit to the degree to which the high voltage power supply could boost the output voltage.

Accordingly, the high voltage power supply employs a voltage multiplier to boost the input voltage so as to generate the high output voltage.

However, as the input voltage is doubled, quadrupled, etc., electric current stress of the capacitor included in the voltage multiplier increases, thereby slowing down the response time of a system.

SUMMARY

Aspects of the exemplary embodiments relate to a high voltage power supply which utilizes a plurality of voltage multipliers that are connected in series.

A high voltage power supply, according to an exemplary embodiment, includes an inverter which converts a DC voltage input to the high voltage power supply into an AC voltage, a transformer which receives the converted AC voltage from an input winding unit and generates an AC voltage converted from a plurality of output winding units, and a voltage multiplier unit which boosts the generated AC voltage by even number times and outputs the boosted voltage, and the voltage multiplier unit includes a plurality of voltage multipliers which are connected to each other in series and the plurality of voltage multipliers may be connected to the plurality of output winding units respectively.

The high voltage power supply may further include a controller which controls a level to which the output AC voltage is boosted.

The plurality of voltage multipliers may include a first voltage multiplier and a second voltage multiplier, and the plurality of output winding units may include a first winding unit connected to the first voltage multiplier and a second winding unit connected to the second voltage multiplier.

A polarity of the input winding unit may be the same as a polarity of the first winding unit and the second winding unit.

The first voltage multiplier may include a first, second, and third capacitors and first, second, and third diodes, and one end of the first capacitor may be connected to one end of the first winding unit, and the other end of the first capacitor may be connected to a first node, a cathode of the first diode may be connected to the first node, and an anode of the first diode may be connected to a second node which is the other end of the first winding unit, one end of the second capacitor may be connected to the second node, and the other end of the second capacitor may be connected to a third node, a cathode of the second diode may be connected to the third node, and an anode of the second diode may be connected to the first node, one end of the third capacitor may be connected to the first node, and the other end of the third capacitor may be connected to a fourth node, a cathode of the third diode may be connected to the fourth node, and an anode of the third diode may be connected to the third node, and the fourth node may be connected to the second voltage multiplier.

The second voltage multiplier may include fourth, fifth, and sixth capacitors and fourth, fifth, and sixth diodes, and one end of the fourth capacitor may be connected to the fourth node, and the other end of the fourth capacitor may be connected to a fifth node, an anode of the fourth diode may be connected to the fourth node, and a cathode of the fourth diode may be connected to a sixth node, one end of the fifth capacitor may be connected to the sixth node, and the other end of the fifth capacitor may be connected to a seventh node, an anode of the fifth diode may be connected to the sixth node, and a cathode of the fifth diode may be connected to the fifth node, one end of the sixth capacitor may be connected to the fifth node, and the other end of the sixth capacitor may be connected to an eighth node which is one end of the second winding unit, and an anode of the sixth diode may be connected to the fifth node and a cathode of the sixth diode may be connected to the seventh node which is other end of the second winding unit.

The first voltage multiplier may turn on the first diode and the second diode if the generated AC voltage is applied to the second node, and turn on the second diode if the generated AC voltage is applied to the first node.

The second voltage multiplier may turn on the fourth diode and the sixth diode if the generated AC voltage is input to the eighth node, and turn on the fifth diode if the generated AC voltage is applied to the seventh node.

A voltage which is the same as the generated AC voltage may be applied to the first capacitor (C1), and a voltage which is boosted by two times the generated AC voltage may be applied to the second capacitor, the third capacitor, the fourth capacitor, and the sixth capacitor.

BRIEF DESCRIPTION OF THE DRAWINGS

The above and/or other aspects of the present disclosure will be more apparent by describing certain exemplary embodiments with reference to the accompanying drawings, in which.

DETAILED DESCRIPTION OF THE EXEMPLARY EMBODIMENTS

Figure 1:
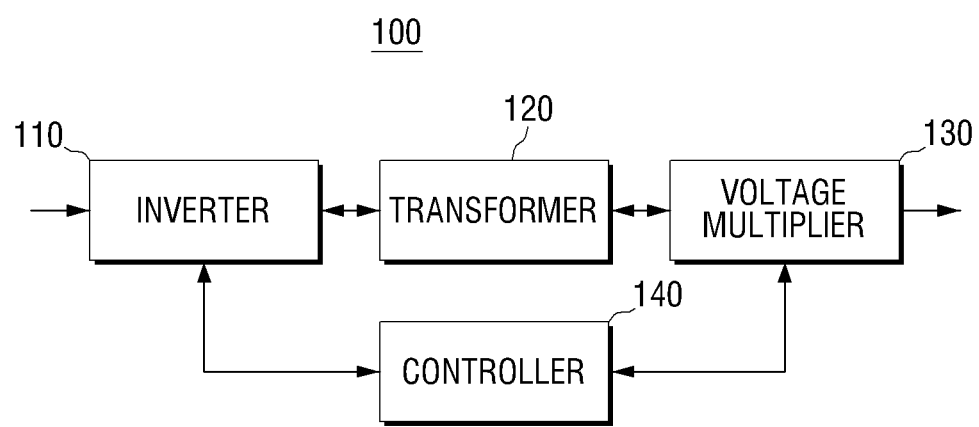
FIG. 1 is a view illustrating a high voltage power supply according to an exemplary embodiment.

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Referring to FIG. 1, the high voltage power supply 100 includes an inverter 110, a transformer 120, a voltage multiplier 130, and a controller 140.

The inverter 110 converts a DC voltage input to the high voltage power supply 100 into an AC voltage. Specifically, the inverter 110 receives a DC voltage output from a power factor correction (PFC) circuit (not shown) and converts the DC voltage into an AC voltage in a sinusoidal wave pattern.

An input winding unit of the transformer 120 receives the converted AC voltage from the inverter 110 and outputs the converted AC voltage using a plurality of output winding units. Specifically, the transformer 120 includes a primary winding unit, that is, an input winding unit, and a secondary winding unit, that is, an output winding unit, and the output winding unit. There may be more than one output winding unit.

The transformer 120 may boost the voltage input to the transformer 120 according to the turn ratio of the first winding unit and the second winding unit and then output the boosted voltage. The high voltage power supply 100 may further boost the output voltage by using the voltage multiplier 130 which will be explained later, rather than by controlling the turn ratio of the transformer 120.

The voltage multiplier 130 boosts the generated AC voltage by an even multiple and outputs the boosted voltage. Specifically, the voltage multiplier 130 includes a plurality of voltage multipliers which are connected to each other in series, and each of the plurality of voltage multipliers are connected to a plurality of output winding units respectively. The voltage multiplier 130 will be explained later in greater detail with reference to the related figures.

The controller 140 controls the level to which the output AC voltage is boosted. Specifically, the controller 140 controls the inverter 110, and may boost a final output voltage by using a pulse width modulation (PWM) method or a pulse frequency modulation (PFM) method. As in the above description regarding the transformer 120, the high voltage power supply 100 may boost the output voltage preferably by using a voltage multiplier 130.

The high voltage power supply 100 may be used in various devices such as a television, an image forming apparatus, a plasma generator, and in a power supply for driving a LDC TV or the backlight unit of a LED TV.

Accordingly, the high voltage power supply 100 may reduce stress of electric current of the capacitor included in a plurality of voltage multipliers and enhance the response time of the high voltage power supply by using a plurality of voltage multipliers which are connected to each other in series.

Figure 2:
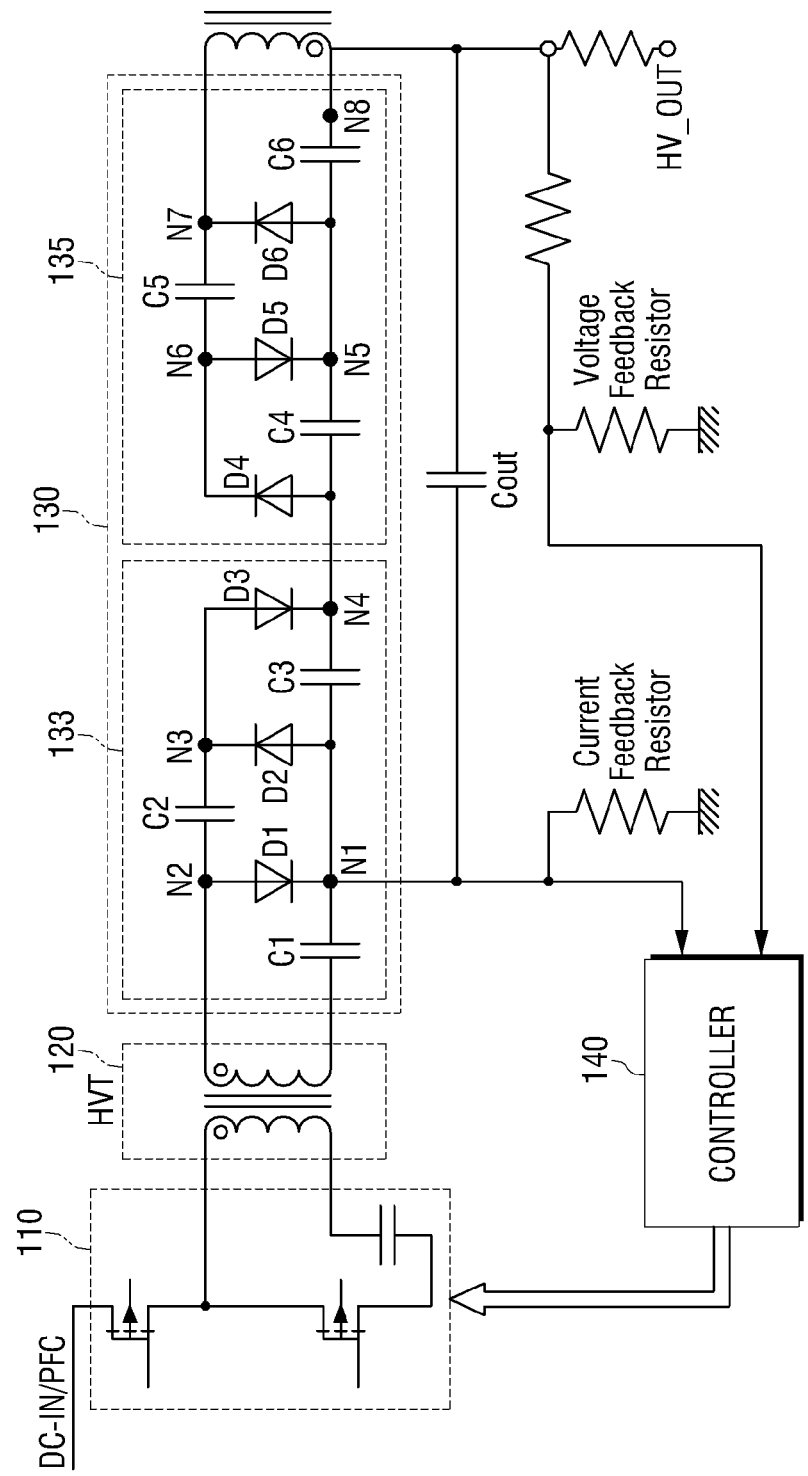
FIG. 2 is a view provided to explain the high voltage power supply in FIG. 1 in greater detail.

FIG. 2 is a view provided to explain the high voltage power supply in FIG. 1 in greater detail. For convenience of explanation, the voltage multiplier 130 is assumed to be a voltage multiplier which boosts the voltage by 6 times, but the high voltage power supply 100 is not required to boost the voltage by 6 times. The voltage multiplier which boosts the voltage by 6 times means a circuit which outputs the final output voltage of the high voltage power supply 100 that is as much as six times greater than the AC voltage generated from the transformer 120. Referring to FIG. 2, the voltage multiplier 130 includes a first voltage multiplier 133 and a second voltage multiplier 135.

The first voltage multiplier 133 includes first capacitor C1, second capacitor C2, third capacitor C3, first diode D1, second diode D2, and third diode D3.

In the same way, the second voltage multiplier 135 includes a fourth capacitor C4, fifth capacitor C5, sixth capacitor C6, fourth diode D4, fifth diode D5, and sixth diode D6.

The first voltage multiplier 133 and the second voltage multiplier 135 are connected to each other in series.

In the first voltage multiplier 133, the first diode D1 and the third diode D3 may be turned on together, or only the second diode D2 may be turned on according to the direction in which a voltage is applied from the transformer 120.

In the same way, in the second voltage multiplier 135, the fourth diode D4 and the sixth diode D6 may be turned on together, or only the fifth diode D5 may be turned on according to the direction in which a voltage is applied from the transformer 120.

Each of the first voltage multiplier 133 and the second voltage multiplier 135 may perform rectification, and an AC voltage may be applied to the first through sixth capacitors (C1-C6) accordingly.

The structure of the first voltage multiplier 133 and the second voltage multiplier 135 may be symmetrical except for the direction of the diode included in each of the first voltage multiplier 133 and the second voltage multiplier 135.

The high voltage power supply 100 may further include an output capacitor (Cout) to output an output voltage from the high voltage power supply 100 as illustrated in FIG. 2. In FIG. 2, the voltages applied to the third capacitor C3, the fourth capacitor C4, and the sixth capacitor C6 respectively are added and output as the final voltage. However, the high voltage power supply 100 may be configured such that the voltages of the third capacitor C3 and the fourth capacitor C4 may be added to output as the final voltage although the configuration is not limited thereto.

In addition, the high voltage power supply 100 may further include a current feedback resistor, which prevents excessive electric current from flowing into the controller 140, and a voltage feedback resistor which prevents excessive voltage from being applied to the controller 140.

Figure 3:
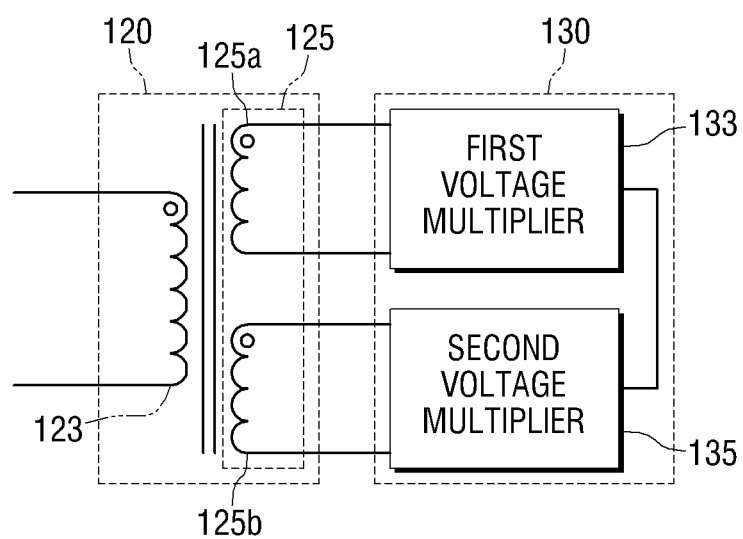
FIG. 3 is a view provided to explain the structure of the high voltage power supply in greater detail.

FIG. 3 is a view provided to explain the structure of the high voltage power supply in greater detail.

Referring to FIGS. 2 and 3, the high voltage power supply 100 has one input winding unit 123 of the transformer 120, but there may be two output winding units 125 of the transformer 120.

The polarity of the input winding unit 123 may be the same as the polarity of a first winding unit 125a and a second winding unit 125b of the output winding unit 125.

If the polarity of the first winding unit 125a changes, the direction of the AC voltage applied to the first, second, and third capacitors C1, C2, and C3, respectively, included in the first voltage multiplier 133 may change. That is, as the polarity of the first winding unit 125a changes, the design of the elements included in the first voltage multiplier 133 may change. For example, the direction of the first, second, and third diodes D1, D2, and D3, respectively, may change.

The first winding unit 125a may be connected to the first voltage multiplier 133 in series, the first voltage multiplier 133 may be connected to the second voltage multiplier 135 in series, and the second voltage multiplier 135 may be connected to the second winding unit 125b in series.

Each of the first voltage multiplier 133 and the second voltage multiplier 135 of the high voltage power supply 100 may be realized based on a Cockcroft-Walton voltage multiplier. However, the structure may be different from that of a Cockcroft-Walton voltage multiplier in that one side of each of the first voltage multiplier 133 and the second voltage multiplier 135 is connected to each other in series and the other side of each of the first voltage multiplier 133 and the second voltage multiplier 135 is connected to the first winding unit 125a and the second winding unit 125b respectively.

The circuit structure of the first voltage multiplier 133 is as follows.

One end of the first capacitor C1 is connected to one end of the first winding unit 125a, and the other end of the first capacitor C1 is connected to the first node N1.

The cathode of the first diode D1 is connected to the first node N1, and the anode of the first diode D1 is connected to the second node N2 which is the other end of the first winding unit 125a.

One end of the second capacitor C2 is connected to the second node N2, and the other end of the second capacitor C2 is connected to the third node N3.

The cathode of the second diode D2 is connected to the third node N3, and the anode of the second diode D2 is connected to the first node N1.

One end of the third capacitor (C3) is connected to the first node N1, and the other end of the third capacitor C3 is connected to the fourth node N4.

The cathode of the third diode D3 is connected to the fourth node N4, and the anode of the third diode D3 is connected to the third node N3.

Accordingly, the fourth node N4 of the first voltage multiplier 133 may be connected to the second voltage multiplier 135.

In addition, the first winding unit 125a, the first capacitor C1, and the first diode D1 constitute a first closed loop, the first diode D1, the second diode D2, and the second capacitor C2 constitute a second closed loop, and the second diode D2, the third capacitor C3, and the third diode D3 constitute a third closed loop. Accordingly, the first voltage multiplier 133 may be a three times voltage multiplier in which the first, second, and third closed loops are disposed in series.

The circuit structure of the second voltage multiplier 135 is as follows.

One end of the fourth capacitor C4 is connected to the fourth node N4, and the other end of the fourth capacitor C4 is connected to the fifth node N5.

The anode of the fourth diode D4 is connected to the fourth node N4, and the cathode of the fourth diode D4 is connected to the sixth node N6.

One end of the fifth capacitor C5 is connected to the sixth node N6, and the other end of the fifth capacitor C5 is connected to the seventh node N7.

The anode of the fifth diode D5 is connected to the sixth node N6, and the cathode of the fifth diode D5 is connected to the fifth node N5.

One end of the sixth capacitor C6 is connected to the fifth node N5, and the other end of the sixth capacitor C6 is connected to the eighth node N8 which is one end of the second winding unit 125b.

The anode of the sixth diode D6 may be connected to the fifth node N5, and the cathode of the sixth diode D6 may be connected to the seventh node N7 which is the other end of the second winding unit 125b.

In addition, the first diode D4, the fifth diode D5, and the fourth capacitor C4 constitute a fourth closed loop, the fifth diode D5, the fifth capacitor C5, and the sixth diode D6 constitute a fifth closed loop, and the sixth diode D6, the second winding unit 125b, and the sixth capacitor C6 constitute a sixth closed loop. Accordingly, the second winding unit 135 may be a three times circuit in which the fourth, fifth, and sixth closed loops are disposed in series.

That is, unlike a related art six times voltage multiplier in which the first through sixth closed loops are connected in series, the first voltage multiplier 133 which is a three times voltage multiplier and the second voltage multiplier 135 which is a three times voltage multiplier may be connected in series in the voltage multiplier unit 130. Accordingly, the high voltage power supply 100 may reduce the electric current flowing in the first capacitor C1 of the first voltage multiplier 133 by half, and thus may reduce the electric stress of the first capacitor C1, as compared to a related art six times circuit in which the first to the sixth closed loops are connected in series.

In addition, unlike a related art six times circuit in which the first to the sixth closed loops are connected in series, the high voltage power supply 100 may improve the response time of the high voltage power supply 100.

In this exemplary embodiment, the high voltage power supply 100 has a structure in which a first three times voltage multiplier 133 and a second three times voltage multiplier 135 are connected in series, but this is only an example. A first two times voltage multiplier and a second two times voltage multiplier, or a first four times voltage multiplier and a second four times voltage multiplier may be connected in series, but the structure is not limited thereto.

Figure 4A:
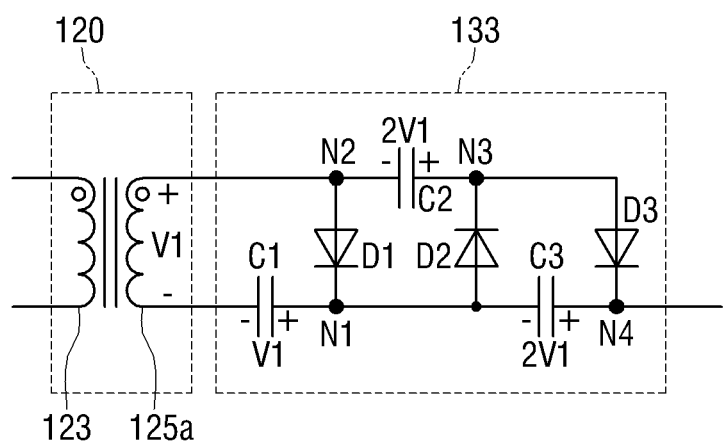
FIG. 4A is a view provided to explain the operation of the voltage multiplier of the high voltage power supply.
Figure 4B:
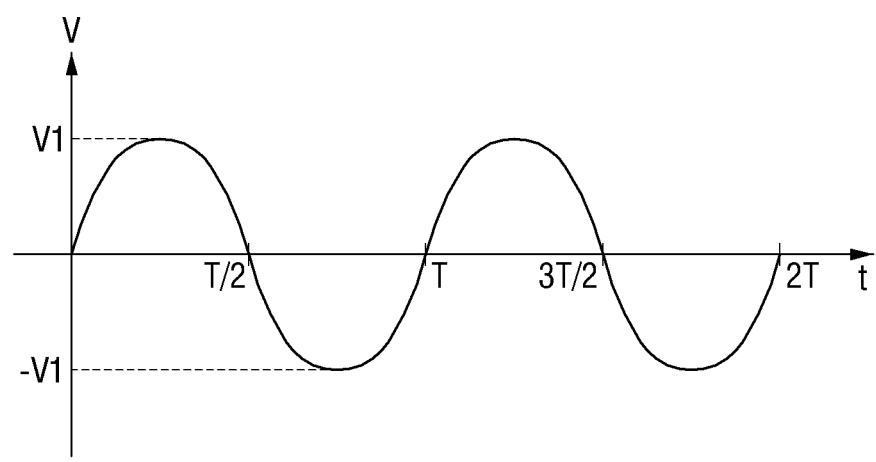
FIG. 4B is a view illustrating a voltage wave form used for the high voltage power supply.

FIG. 4A is a view provided to explain the operation of the voltage multiplier of the high voltage power supply, and FIG. 4B is a view illustrating a voltage wave form used for the high voltage power supply. Since the operation of the first voltage multiplier 133 is the same as the operation of the second voltage multiplier 135, only the operation of the first voltage multiplier 133 will be explained with reference to FIGS. 4A and 4B.

If a voltage wave form in the forward direction is generated in the first winding unit 125a of the transformer 120 as in FIG. 4B, that is, if the AC voltage generated from the transformer 120 is input to the second node N2, the first diode D1 may be turned on (let electric current flow) during half period (0~T/2). Accordingly, the first capacitor (C1) may be charged to have a voltage V1 as illustrated in FIG. 4A.

If a voltage wave form in the reverse direction is generated in the first winding unit 125a of the transformer 120 as in FIG. 4B, that is, if the AC voltage generated from the transformer 120 is input to the first node N1, the first diode D1 may be turned off (prevent electric current from flowing) during the next half period (T/2~T) and the second diode may be turned on. Accordingly, the second capacitor C2 may be charged to have a voltage of 2V1 as illustrated in FIG. 4A.

If a voltage wave form in the forward direction is generated in the first winding unit 125a of the transformer 120 as in FIG. 4B, that is, if the AC voltage generated from the transformer 120 is input to the second node N2, the third diode D3 may be turned on (let electric current flow) during the next half period (T~3T/2). Accordingly, the third capacitor C3 may be charged to have a voltage of 2V1 as illustrated in FIG. 4A.

In the exemplary embodiment, the time for charging the first capacitor C1 and the time for charging the third capacitor C3 are set to be the same for convenience of explanation, but the operation of charging the first capacitor C1 and the operation of charging the third capacitor C3 may be performed simultaneously during the first half period (0~T/2).

That is, if an AC sine wave form whose peak value is V1 is generated in the first winding unit 125a of the transformer 120, the first capacitor C1 may be charged to have a voltage whose peak value is V1, and the second capacitor C2 and the third capacitor C3 may be charged to have a voltage whose peak value is 2V1.

Accordingly, a voltage whose peak value is 3V1 may be applied between the first capacitor C1 and the third capacitor C3. Since the second voltage multiplier 135 operates in the same way as the first voltage multiplier 133, each capacitor of the second voltage multiplier 135 connected to the first voltage multiplier 133 in series may have the same voltage as the capacitors of the first voltage multiplier 133.

That is, the voltage which is the same as the generated AC voltage may be applied to the first capacitor C1, and the voltage which is boosted by two times the generated AC voltage may be applied to the second capacitor C2, the third capacitor (C3) C3, the fourth capacitor C4, and the sixth capacitor C6.

The high voltage power supply 100 may reduce the stress on the first capacitor C1 caused by electric current, as compared to a related art six times circuit in which the first through sixth closed loops are connected in series. Thus, the response time of the high voltage power supply 100 is improved.

Figure 5A:
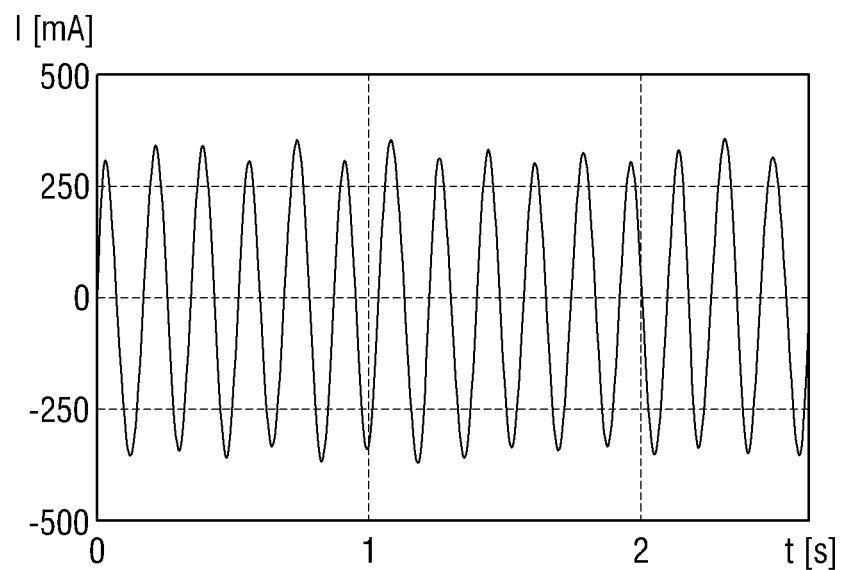
FIG. 5A is a view illustrating the wave form of electric current flowing in the capacitor which is included in the voltage multiplier of a general high voltage power supply.
Figure 5B:
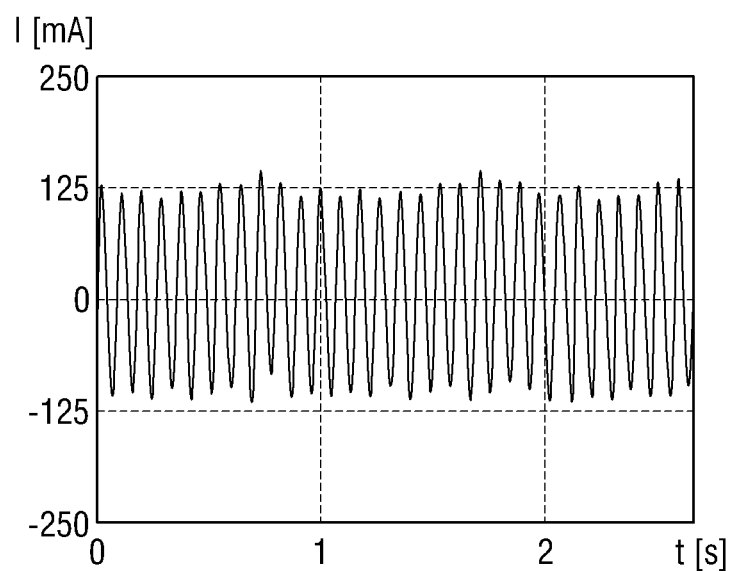
FIG. 5B is a view illustrating electric current flowing in a first capacitor of the high voltage power supply.

FIG. 5A is a view illustrating the wave form of electric current flowing in the capacitor which is included in the voltage multiplier of a related art high voltage power supply, and FIG. 5B is a view illustrating electric current flowing in the first capacitor C1 of the high voltage power supply 100.

Referring to FIG. 5A, approximately 267 mA of peak electric current is generated in the first capacitor of a related art high voltage power supply with a voltage multiplier in which the first through sixth closed loops are connected in series. As shown in FIG. 5B, approximately 127 mA of peak electric current is generated in the first capacitor C1 of the high voltage power supply 100. Thus, the amount of electric current flowing in the first capacitor is reduced, thereby relieving the electric stress of the first capacitor.

Although a few exemplary embodiments have been shown and described, it would be appreciated by those skilled in the art that changes may be made to these exemplary embodiments without departing from the principles and spirit of the invention, the scope of which is defined in the claims and their equivalents.

What is claimed is:

1. A high voltage power supply, comprising:
an inverter which converts a DC voltage input to the high voltage power supply into a first AC voltage;
a transformer comprising an input winding unit and a plurality of output winding units, wherein the input winding unit receives the first AC voltage from the inverter and the plurality of output winding units generates and outputs a second AC voltage; and
a voltage multiplier unit which boosts the second AC voltage output by the transformer and outputs a boosted voltage;
wherein the voltage multiplier unit comprises a plurality of voltage multipliers which are connected to each other in series and the plurality of voltage multipliers are connected to the plurality of output winding units respectively.

2. The high voltage power supply as claimed in claim 1, further comprising:
a controller which controls a level to which the second AC voltage is boosted.

3. The high voltage power supply as claimed in claim 1, wherein the plurality of voltage multipliers comprise a first voltage multiplier and a second voltage multiplier,
wherein the plurality of output winding units comprises a first output winding unit connected to the first voltage multiplier and a second output winding unit connected to the second voltage multiplier.

4. The high voltage power supply as claimed in claim 3, wherein a polarity of the input winding unit is the same as a polarity of the first output winding unit and the second output winding unit.

5. The high voltage power supply as claimed in claim 4, wherein the first voltage multiplier comprises a first capacitor, a second capacitor, a third capacitor, a first diode, a second diode, and a third diode,
wherein a first end of the first capacitor is connected to a first end of the first output winding unit, and a second end of the first capacitor is connected to a first node,
wherein a cathode of the first diode is connected to the first node, and an anode of the first diode is connected to a second node, which is a second end of the first output winding unit,
wherein a first end of the second capacitor is connected to the second node, and a second end of the second capacitor is connected to a third node,
wherein a cathode of the second diode is connected to the third node, and an anode of the second diode is connected to the first node,
wherein a first end of the third capacitor is connected to the first node, and a second end of the third capacitor is connected to a fourth node,
wherein a cathode of the third diode is connected to the fourth node, and an anode of the third diode is connected to the third node,
wherein the fourth node is connected to the second voltage multiplier.

6. The high voltage power supply as claimed in claim 5, wherein the second voltage multiplier comprises a fourth capacitor, a fifth capacitor, a sixth capacitor, a fourth diode, a fifth diode, and a sixth diode,
wherein a first end of the fourth capacitor is connected to the fourth node, and a second end of the fourth capacitor is connected to a fifth node,
wherein an anode of the fourth diode is connected to the fourth node, and a cathode of the fourth diode is connected to a sixth node,
wherein a first end of the fifth capacitor is connected to the sixth node, and a second end of the fifth capacitor is connected to a seventh node,
wherein an anode of the fifth diode is connected to the sixth node, and a cathode of the fifth diode is connected to the fifth node,
wherein a first end of the sixth capacitor is connected to the fifth node, and a second end of the sixth capacitor is connected to an eighth node which is a first end of the second output winding unit,
wherein an anode of the sixth diode is connected to the fifth node, and a cathode of the sixth diode is connected to the seventh node, which is a second end of the second output winding unit.

7. The high voltage power supply as claimed in claim 5, wherein the first voltage multiplier turns on the first diode and the third diode if the second AC voltage is applied to the second node, and turns on the second diode if the second AC voltage is applied to the first node.

8. The high voltage power supply as claimed in claim 6, wherein the second voltage multiplier turns on the fourth diode and the sixth diode if the second AC voltage is input to the eighth node, and turns on the fifth diode if the second AC voltage is applied to the seventh node.

9. The high voltage power supply as claimed in claim 6, wherein a first voltage which is the same as the second AC voltage is applied to the first capacitor, and a second voltage which is two times the second AC voltage is applied to the second capacitor, the third capacitor, the fourth capacitor, and the sixth capacitor.

10. The high voltage power supply as claimed in claim 1, wherein the voltage multiplier unit boosts the second AC voltage to generate the boosted voltage such that the boosted voltage is an even multiple of the second AC voltage.

11. The high voltage power supply as claimed in claim 2, wherein the controller controls a level to which the second AC voltage is boosted using a pulse width modulation method or a pulse frequency modulation method.

12. A high voltage power supply, comprising:
a transformer comprising an input winding unit, a first output winding unit, and a second output winding unit, wherein the input winding unit receives a first AC voltage and the first output winding unit and the second output winding unit generate and output a second AC voltage; and
a voltage multiplier unit which boosts the second AC voltage output by the transformer and outputs a boosted voltage;
wherein the voltage multiplier unit comprises a first voltage multiplier that is connected in series to the first output winding unit, and a second voltage multiplier that is connected in series to the second output winding unit.

13. The high voltage power supply as claimed in claim 12, further comprising:
a controller which controls a level to which the second AC voltage is boosted.

14. The high voltage power supply as claimed in claim 12, wherein a polarity of the input winding unit is the same as a polarity of the first output winding unit and the second output winding unit.

15. The high voltage power supply as claimed in claim 14, wherein the first voltage multiplier comprises a first capacitor, a second capacitor, a third capacitor, a first diode, a second diode, and a third diode,
wherein a first end of the first capacitor is connected to a first end of the first output winding unit, and a second end of the first capacitor is connected to a first node,
wherein a cathode of the first diode is connected to the first node, and an anode of the first diode is connected to a second node, which is a second end of the first output winding unit,
wherein a first end of the second capacitor is connected to the second node, and a second end of the second capacitor is connected to a third node,
wherein a cathode of the second diode is connected to the third node, and an anode of the second diode is connected to the first node,
wherein a first end of the third capacitor is connected to the first node, and a second end of the third capacitor is connected to a fourth node,
wherein a cathode of the third diode is connected to the fourth node, and an anode of the third diode is connected to the third node,
wherein the fourth node is connected to the second voltage multiplier.

16. The high voltage power supply as claimed in claim 15, wherein the second voltage multiplier comprises a fourth capacitor, a fifth capacitor, a sixth capacitor, a fourth diode, a fifth diode, and a sixth diode,
wherein a first end of the fourth capacitor is connected to the fourth node, and a second end of the fourth capacitor is connected to a fifth node,
wherein an anode of the fourth diode is connected to the fourth node, and a cathode of the fourth diode is connected to a sixth node,
wherein a first end of the fifth capacitor is connected to the sixth node, and a second end of the fifth capacitor is connected to a seventh node,
wherein an anode of the fifth diode is connected to the sixth node, and a cathode of the fifth diode is connected to the fifth node,
wherein a first end of the sixth capacitor is connected to the fifth node, and a second end of the sixth capacitor is connected to an eighth node which is a first end of the second output winding unit,
wherein an anode of the sixth diode is connected to the fifth node, and a cathode of the sixth diode is connected to the seventh node, which is a second end of the second output winding unit.

17. The high voltage power supply as claimed in claim 15, wherein the first voltage multiplier turns on the first diode and the third diode if the second AC voltage is applied to the second node, and turns on the second diode if the second AC voltage is applied to the first node.

18. The high voltage power supply as claimed in claim 16, wherein the second voltage multiplier turns on the fourth diode and the sixth diode if the second AC voltage is input to the eighth node, and turns on the fifth diode if the second AC voltage is applied to the seventh node.

19. The high voltage power supply as claimed in claim 16, wherein a first voltage which is the same as the second AC voltage is applied to the first capacitor, and a second voltage which is two times the second AC voltage is applied to the second capacitor, the third capacitor, the fourth capacitor, and the sixth capacitor.

20. The high voltage power supply as claimed in claim 12, wherein the voltage multiplier unit boosts the second AC voltage to generate the boosted voltage such that the boosted voltage is an even multiple of the second AC voltage.

* * * * *